United States Patent [19]

Adams et al.

[11] Patent Number: 4,835,670

[45] Date of Patent: May 30, 1989

[54] MICROCOMPUTER FUEL BURNER CONTROL HAVING SAFETY INTERLOCK MEANS

[75] Inventors: Wilmer L. Adams, Fridley; Kenneth B. Kidder, Coon Rapids; William R. Landis, Bloomington, all of Minn.

[73] Assignee: Honeywell Inc., Minneapolis, Minn.

[21] Appl. No.: 146,623

[22] Filed: Jan. 21, 1988

[51] Int. Cl.$^4$ .................. G05B 9/02; F23N 5/24; F23Q 9/08

[52] U.S. Cl. .................. 364/184; 364/187; 371/16; 371/18; 371/21; 431/18; 431/24; 431/66; 307/328

[58] Field of Search .............. 364/176, 184, 187, 192, 364/431.01, 477, 580; 431/18, 5, 12, 20, 24, 25, 29, 31, 66, 2; 307/328; 371/15, 16, 18, 21, 9, 10

[56] References Cited

U.S. PATENT DOCUMENTS

| | | | |
|---|---|---|---|
| 4,035,135 | 7/1977 | Jacobsz | 431/31 |
| 4,101,258 | 7/1978 | Jacobsz | 431/31 |
| 4,267,965 | 5/1981 | Everett | 431/20 |
| 4,348,169 | 9/1982 | Swithenbank et al. | 431/24 |
| 4,686,356 | 8/1987 | Ueda et al. | 364/477 |

*Primary Examiner*—Jerry Smith
*Assistant Examiner*—P. Gordon
*Attorney, Agent, or Firm*—Alfred N. Feldman

[57] ABSTRACT

A microcomputer control utilizes a nonvolatile memory with an interlock. The interlock functions upon the removal of the microcomputer control from a base or from a mounting surface, and its reinstallation. The removal and reinstallation deletes memory and requires reprogramming. This prevents the removal of a microcomputer control that is protected by battery backup without reprogramming the memory. This safety function is particularly useful in flame safeguard or burner control equipment where the interchange of microcomputer fuel burner controls without reprogramming for the particular burner could create a hazard.

14 Claims, 2 Drawing Sheets

MICROCOMPUTER FUEL BURNER CONTROL HAVING SAFETY INTERLOCK MEANS

BACKGROUND OF THE INVENTION

In recent years microcomputer based fuel burner control systems have been developed and are widely used. These systems typically are individual microcomputer based controls that are dedicated to the operation of a single fuel burner installation. The particular model of the microcomputer based fuel burner control system used with a particular fuel burner, and its related equipment, are selected so that the fuel burner control system and the fuel burner are compatible. Once the system is installed, it would be apparent to anyone servicing the unit that an exact model replacement would be required if the control system were to be serviced or interchanged for any reason.

Microcomputer fuel burner control systems are evolving so that some of the equipment used with the system is standard, while other components of the system are carefully selected for use with a particular fuel burner. Further, a new family of burner control systems utilizing microcomputers has been developed where the control means for the fuel burner contains the microcomputer, the memory to include a nonvolatile memory for retaining user programmed information, and other essential components. These units have been made physically interchangeable and a potential hazard can be created if the fuel burner control means from one burner is interchanged with the fuel burner control means on a different fuel burner This hazardous condition occurs when the interchange is made between fuel burners operating boilers of different types or capacities. It is not uncommon in a single boiler room to have up to four different boiler installations, each with their own fuel burner control system. If the burners and boilers are different in characteristics or capacities, the interchange of the fuel burner control means from one unit to another could create a hazardous condition. This is particularly true if a nonvolatile memory is used to retain field-programmed information in the system, and the fuel burner control means are not reprogrammed when units are moved from one fuel burner and boiler installation to another.

SUMMARY OF THE INVENTION

The present invention is directed to a fuel burner control system in which a standardized base model or unit, and keyboard and display module are used in each installation. The installations are completed by the mounting of a fuel burner control means or program module, into the standardized base module, with the program module containing a microcomputer, memory means, and an interlock means. Each of the fuel burner control means is then individually programmed to operate the fuel burner and boiler upon which it is installed.

The programming of the memory is tailored to the particular installation. The nonvolatile memory in the system retains programming data during a power failure. The fact that the system cannot distinguish its physical removal and its reinstallation in a different fuel burner control installation from a power failure, can create a hazardous condition.

The present invention overcomes this hazardous condition by providing an interlock means that acts upon the removal of the fuel burner control means from its base module to insure that the reinstallation of that fuel burner control means on a base requires reprogramming. Further, this invention protects against the removal of the base module from its mounting surface. The movement of the fuel burner control means from one base module to another operates the mechanical interlock means in such a way as to cause the elimination from memory the material programmed that relates to the specific installation, and thereby requires reprogramming of that information any time the fuel burner control means is moved to a new base or mounting surface.

The present invention relies on interlock means to cause deletion of memory upon the movement of the unit from one location or another, or even the reinstallation in its original location. The removal and reinstallation requires reprogramming thereby ensuring that the fuel burner control system is programmed properly for the particular fuel burner and boiler upon which it is installed for operation.

In accordance with the present invention, there is provided a microcomputer fuel burner control system having a nonvolatile memory to retain programmed information in a memory within said control system, including: base means with said base means having electrical connection means; said electrical connection means adapted to connect said base means to fuel burner means to be controlled, and to electrical source means; fuel burner control means including a microcomputer control system adapted to control said fuel burner means; said control means further including a battery backup system that recognizes when said control means has been removed from said control system; said fuel burner control means including electrical connection means for electrical interconnection to said base means electrical connection means; and interlock means responsive to the disconnection and subsequent re-connection of said fuel burner control means to avoid an unsafe condition; said interlock means and said microcomputer control system responding to the removal of said fuel burner control means and the subsequent reinstallation of said fuel burner control means by causing the deletion of programmed information to force reprogramming of said memory to avoid an improperly programmed fuel burner control means from being used to replace a properly programmed fuel burner control means.

Further in accordance with the present invention, there is provided a microcomputer control system having a nonvolatile memory to retain programmed information within said control system, including: base means with said base means having electrical connection means; said electrical connection means adapted to connect said base means to devices to be controlled, and to electrical source means; control means including a microcomputer control system adapted to control said devices; said control means further including a battery backup system that recognizes when said control means has been removed from said control system; said control means including electrical connection means for electrical interconnection to said base means electrical connection means; and interlock means responsive to the disconnection and subsequent re-connection of said control means; said interlock means and said microcomputer control system responding to the removal of said control means and the subsequent reinstallation of said control means by causing the deletion of programmed information to force reprogramming of said memory.

DESCRIPTION OF THE PREFERRED EMBODIMENT

Figure 1:
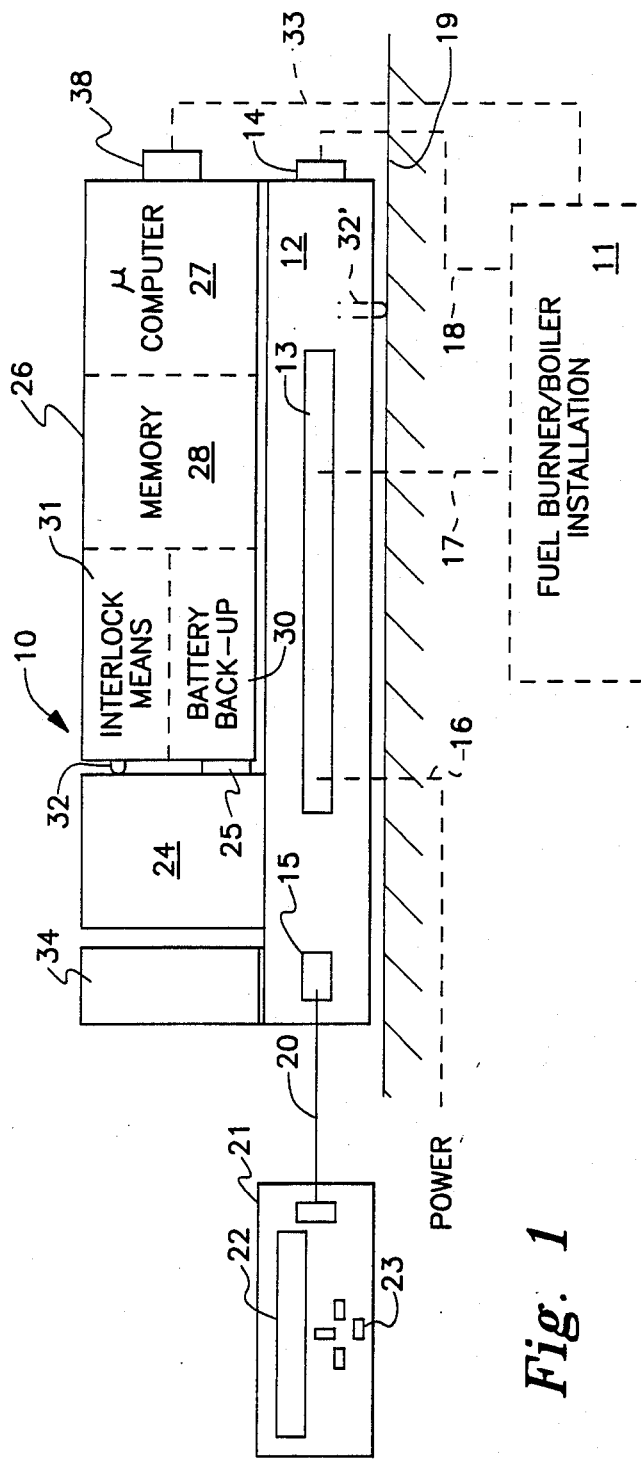
FIG. 1 is a block diagram of a microcomputer fuel burner control system adapted to be connected to a fuel burner and its associated boiler.

FIG. 1 is a block diagram disclosure of a complete microcomputer or microprocessor based fuel burner control system 10. The fuel burner control system 10 is adapted to be connected to a fuel burner and boiler installation generally indicated at 11. Boiler rooms in locations where the present type of microcomputer fuel burner control systems are used typically have from one to four fuel burners and their associated boilers. A single unit will suffice as a basis of explanation of the present invention.

The burner control system 10 includes a base means 12 which is rigidly mounted on a mounting surface 19 at the fuel burner and boiler 11, and interconnected from terminal means 13 and 14 to the fuel burner and boiler 11 by means of conventional wiring. The terminal means 13 is also disclosed as connected to a source of power 16. The base means 12 has a further connector means 15 that is connected by a cable 20 to a keyboard and display module 21 that has a liquid crystal display 22 and the necessary keying means 23 for programming of the microcomputer fuel burner control system 10, as will be discussed subsequently. The liquid crystal display 22 provides the keyboard and display means 21 with a readout of necessary information either as an input means or as an output means.

The base means 12 has a portion 24 that includes the necessary power transformers and circuitry for interconnection at a terminal means 25 to a microcomputer based fuel burner control means 26. The fuel burner control means 26 includes a microcomputer 27, memory means that includes nonvolatile memory 28, and a battery backup means 30 which includes a novel interlock means 31. The novel interlock means 31 includes in part a plunger from a switch means 32 and a further switch means 32' that interacts with the portion 24 of the base means 12 and surface 19 upon installation and removal of the fuel burner control means 26 onto the base means 12 and/or the mounting on surface 19. The fuel burner control means 26 is completed by connector means 38 and the appropriate conductors 33 to the fuel burner and boiler installation 11.

The block diagram of FIG. 1 is completed by the disclosure of a flame amplifier means 34 which is plugged into the base means 12 in a manner that is well-known in the fuel burner art. The plug-in flame amplifier 34 responds to signals from the fuel burner and boiler installation 11 via the conductors or connections 17 and 18. A flame sensor (not shown) at the fuel burner and boiler 11 is included in system 10.

It should be understood that the base means 12 is normally permanently installed on surface 19 at the fuel burner and boiler installation 11, and interconnected by conductors 17 and 18 with the necessary elements in the fuel burner and boiler installation to allow the overall system to function properly with the installation 11. Typically a single keyboard and display module 21 is supplied for each base means 12, but since the keyboard and display module 21 is connected to a connector means 15 on the base means 12, the keyboard and display module 21 could be a single module for each boiler room and could be moved from one installation to another. This unit, in its movement, creates no particular safety hazard, but does create a substantial inconvenience. It is desirable to have a unit 21 at each system to obtain continuous information from the connected microcomputer fuel burner control system 10. The flame amplifier 34 typically is removed from the base means 12 only for service or replacement, and is typically replaced by an equivalent unit and one that does not have a memory or need for reprogramming.

The installation disclosed in FIG. 1, however, does have the fuel burner control means 26 which contains both a battery backup and a memory. The removal of the fuel burner control means 26 from the base means 12 or the base means 12 from surface 19 ordinarily would not cause a change in the nonvolatile memory maintaining all of the information in the microcomputer based equipment. It can be understood that if the installation and operation of the overall system as programmed for one base means 12 is different for another fuel burner and boiler installation 11, that it would be possible to remove the fuel burner control means 26 and/or base means 12 and reinstall it without changing the programming which could create a hazardous condition. The present invention overcomes that by the addition of the interlock means 31 which will be described in some detail.

Figure 2:
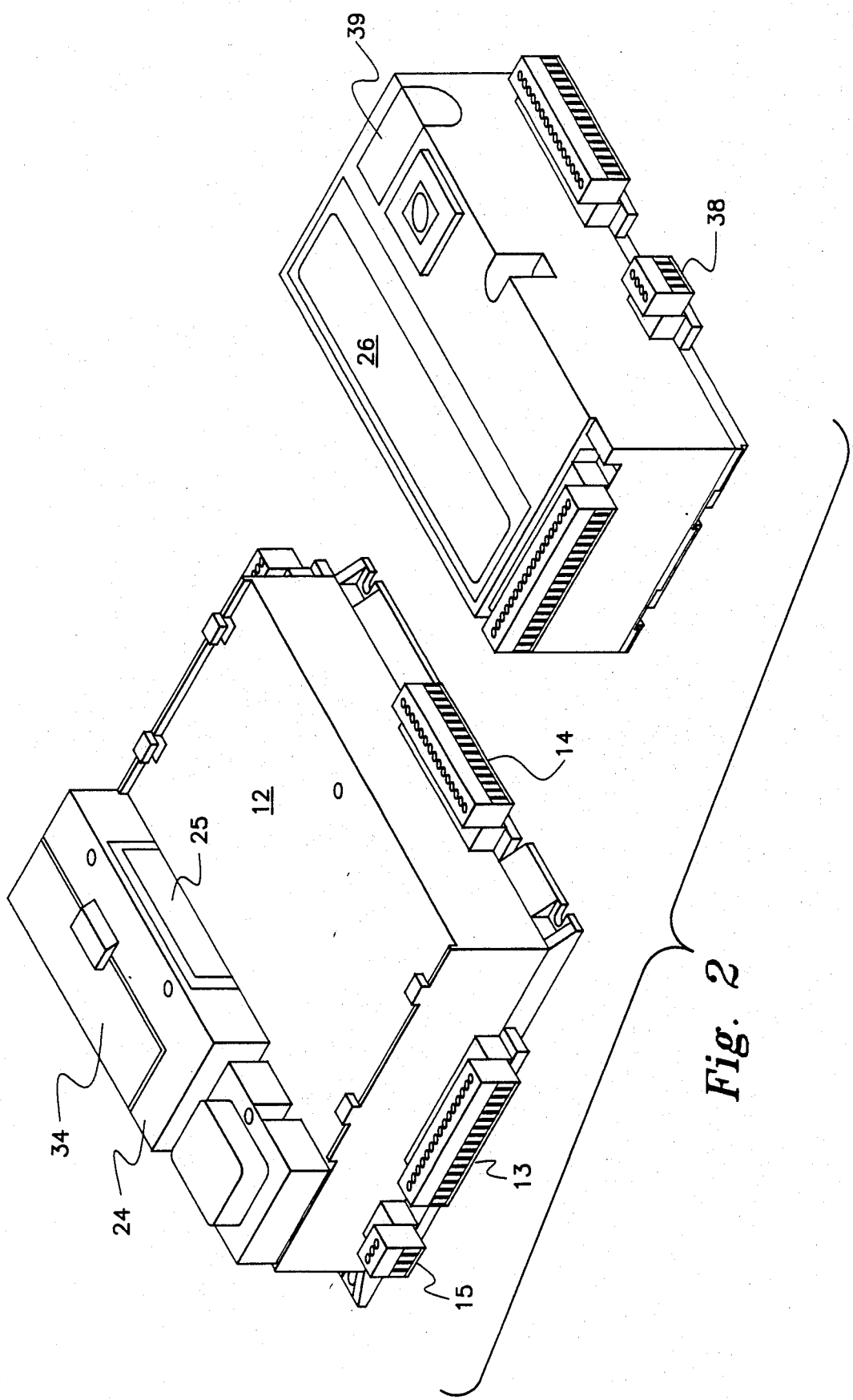
FIG. 2 is an exploded isometric view of a portion of a microcomputer fuel burner control.

In FIG. 2 an exploded isometric disclosure of a base means 12 and control means 26 with connectors 13, 14, and 15 is disclosed. Further, the connection or terminal means 25 for the interconnection between the base means 12 and the fuel burner control means 26 is disclosed. At the location of the connection means 25, there is also a surface that operates the switch means 32 (as shown in FIG. 1) when the fuel burner control means 26 is mounted on the base means 12. The switch means 32 could be replaced by connectors of a conventional plug and socket (not shown). The power supply portion of the base means 12 is shown at 24 along with the location of the plug-in flame amplifier 34.

The exploded isometric view disclosed in FIG. 2 is used to show the physical configuration of an actual unit in which the present interlock means 31 is used. A battery case cover 39 for a backup battery is also shown. It is apparent from FIG. 2 that the base means 12 is capable of receiving the fuel burner control means 26, and that it would be convenient for someone to interchange the fuel burner control means 26 from one unit to another without realizing that a safety problem exists. Also, it would be possible to move one base unit from its original mounting surface to another without reprogramming. If it were not for the interlock means provided in the present invention, the need for reprogramming might be overlooked.

Figure 3:
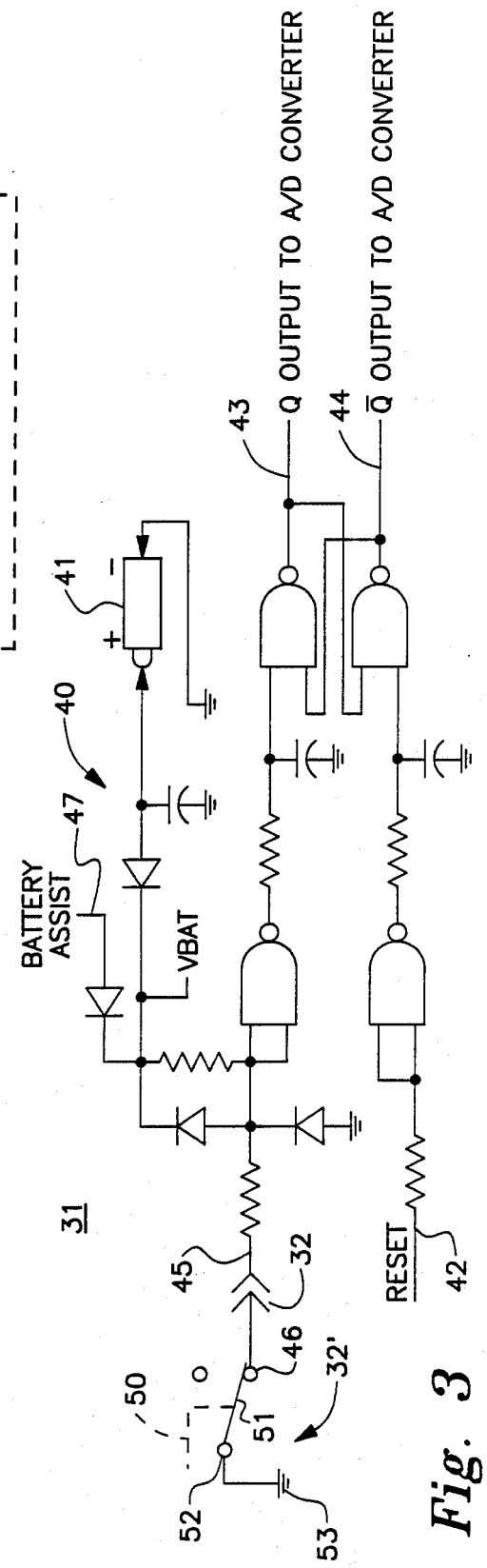
FIG. 3 is a partial circuit diagram of a novel interlock means.

In FIG. 3 a portion of a digital logic circuit means 40 is provided. The digital logic circuit means 40 forms part of the interlock means 31. The interlock means 31 includes a lithium type of battery 41 that supplies power to the digital circuit means 40. In order to ensure that there is little or no battery drain when the power is available, a battery assist circuit at 47 provides power for the interlock means 31 as long as normal power is available. The digital logic circuit means 40 has a reset input 42, and has a pair of outputs 43 and 44. Also provided to the digital logic circuit means 40 is an input conductor 45 that is critical to the interlock function. The conductor 45 includes interlock switch means 32 and 32'. A snap-type switch 32' that has a moveable member 51 connected to a plunger 50 is one embodiment that can be used for this function. A further terminal 52 is connected to ground 53 for the digital logic circuit means 40.

Whenever the fuel burner control means 26 in which the digital logic circuit means 40 is included is removed from the base means 12, the interlock means 32 changes the state of the digital logic circuit means 40. This can also occur if the base unit 12 is removed from mounting surface 19. The change in state is then recognized at the next operation of the system. This means that for each time the fuel burner control means 26 or base means 12 is moved, the interlock means 31 by means of the digital logic circuit means 40 causes the need to reprogram so that the program is appropriate for the particular installation being controlled.

It is apparent that the present invention could be embodied in many physical configurations. The physical embodiments would include a battery backup in a microcomputer based device, and the need to reprogram the device being moved from one physical location to another. The present invention entails a mechanical interlock switch that functions upon the removal of the microprocessor based control from its original base means. Also, the movement of the unit to a new mounting surface causes the need to reprogram. The specific digital logic circuit means and the specific structure of the switch for the interlock means is subject to many variations, and these variations should be limited solely by the scope of the appended claims.

The embodiments of an invention in which an exclusive property or right is claimed are defined as follows:

1. A microcomputer fuel burner control system having a nonvolatile memory to retain programmed information in a memory within said control system, including: base means with said base means having electrical connection means; said electrical connection means adapted to connect said base means to fuel burner means to be controlled, and to electrical source means; fuel burner control means including a microcomputer control system adapted to control said fuel burner means; said control means further including a battery backup system that recognizes when said control means has been removed from said control system; said fuel burner control means including electrical connection means for electrical interconnection to said base means electrical connection means; and interlock means responsive to the disconnection and subsequent re-connection of said fuel burner control means to avoid an unsafe condition; said interlock means and said microcomputer control system responding to the removal of said fuel burner control means and the subsequent reinstallation of said fuel burner control means by causing the deletion of programmed information to force reprogramming of said memory to avoid an improperly programmed fuel burner control means from being used to replace a properly programmed fuel burner control means.

2. A microcomputer fuel burner control system as claimed in claim 1 wherein said interlock means includes digital logic circuit means which is energized by said battery backup system; said digital logic circuit means responding to said disconnection and said subsequent reinstallation of said control means to cause the deletion of programmed information necessary for safe operation of said fuel burner means from said memory.

3. A microcomputer fuel burner control system as claimed in claim 2 wherein said interlock means includes mechanical switch means which is operated by said disconnection and subsequent reinstallation of said control means.

4. A microcomputer fuel burner control system as claimed in claim 3 wherein said mechanical switch means includes a mechanical switch structure having a plunger operable by the mounting of said control means and said base means on a mounting surface.

5. A microcomputer fuel burner control system as claimed in claim 4 wherein said deleted programmed information implements safe operation of said microcomputer control and must be reprogrammed for each use of said control means after removal of said control means.

6. A microcomputer fuel burner control system as claimed in claim 3 wherein said mechanical switch means includes a pair of contact surfaces that make electrical contact when said control means is mounted on said base means.

7. A microcomputer fuel burner control system as claimed in claim 6 wherein said deleted programmed information implements safe operation of said microcomputer control and must be reprogrammed for each use of said control means after removal of said control means.

8. A microcomputer control system having a nonvolatile memory to retain programmed information within said control system, including: base means with said base means having electrical connection means; said electrical connection means adapted to connect said base means to devices to be controlled, and to electrical source means; control means including a microcomputer control system adapted to control said devices; said control means further including a battery backup system that recognizes when said control means has been removed from said control system; said control means including electrical connection means for electrical interconnection to said base means electrical connection means; and interlock means responsive to the disconnection and subsequent re-connection of said control means; said interlock means and said microcomputer control system responding to the removal of said control means and the subsequent reinstallation of said control means by causing the deletion of programmed information to force reprogramming of said memory.

9. A microcomputer control system as claimed in claim 8 wherein said interlock means includes digital logic circuit means which is energized by said battery backup system; said digital logic circuit means responding to said disconnection and said subsequent reinstallation of said control means on said base means to cause the deletion of programmed information from said memory.

10. A microcomputer control system as claimed in claim 9 wherein said interlock means includes mechanical switch means which is operated by said disconnection and subsequent reinstallation of said control means on said base means.

11. A microcomputer control system as claimed in claim 10 wherein said mechanical switch means includes a mechanical switch structure having a plunger operable by the mounting of said control means and said base means on a mounting surface.

12. A microcomputer control system as claimed in claim 11 wherein said deleted programmed information implements safe operation of said microcomputer control and must be reprogrammed for each use of said control means after removal of said control means.

13. A microcomputer control system as claimed in claim 10 wherein said mechanical switch means includes a pair of contact surfaces that make electrical contact when said control means is mounted on said base means.

14. A microcomputer control system as claimed in claim 10 wherein said deleted programmed information implements safe operation of said microcomputer control and must be reprogrammed for each use of said control means after removal of said control means.

* * * * *